Patented Nov. 9, 1943

2,333,959

UNITED STATES PATENT OFFICE 2,333,959

METHOD OF PREVENTING SOIL EROSION

Rollin J. Smith, Kansas City, Kans.

No Drawing. Application January 26, 1942,
Serial No. 428,322

8 Claims. (Cl. 47—9)

This invention relates to soil erosion, and more particularly to prevention of erosion of terraces, slopes, railroad cuts, embankments, or any other place where it may occur.

The primary purpose of the invention is to provide a practical method of protecting plants, planted seeds or the like from wind erosion, sun scorch, lack of moisture or air, wash-out and the like.

Another object is to furnish a novel method conceived to prevent both wind and water erosion on the slopes of both cuts and fills on railroads, highways, terraces and hills, plains, etc.

A further object is to supply a protective method, including the use of a soil paint of such character as to hollow vegetation to grow through, permit infiltration of water, resist surface evaporation, and which is inoffensive for landscaping purposes.

A still further object is to provide an inexpensive but satisfactory slope protection method for use on the plains, cuts and fills of railroads and the like.

In achieving such objects, I have discovered that soil paint, of a particular type, such as a bitumen, or as a bitumen in one of its many forms, for example, cutbacks, emulsions, inverted emulsions, suspensions, road oils, fuel oils, etc. may be used, however, I prefer to use a cutback asphalt which is defined by The Asphalt Institute as "Asphalt cement which has been rendered liquid by fluxing it with a light volatile petroleum distillate. Upon exposure to atmospheric conditions, the volatile distillate evaporates, leaving the asphalt cement behind." If such a cutback asphalt is applied as a thin coat to soil that has been seeded, or seeded and fertilized, the plants will not only grow through, but the protecting coat adheres to the soil, and thereby prevents erosion. Furthermore, the coating tends to crack without scaling from the soil, and the resulting fissures permit the entrance of water and oxygen, while the uncracked portions of the coating function to resist surface evaporation.

Heretofore, it has been proposed to apply various types of mulch to the surface of the ground, but so far as I am aware, none of the prior proposals disclose the use of a continuous coating which will allow the germination and/or growth of vegetation therethrough. Where prior inventors propose to use asphaltic coatings, the coatings were of such character as to require that openings be left therein for the growth of plants therethrough. In contradistinction to such prior proposals, I apply a continuous coating of soil paint to the ground, and over the plants, roots, seeds and the like; the paint being of such character as to permit the infiltration of water and oxygen through interstices formed by the plants themselves, and secondarily, through cracks which will form in the coating.

In using the soil paint, I prefer to proceed as follows. First, fertilizer of any suitable type (if necessary), is applied to the entire area that is to be protected. After the fertilizer has been worked or washed into the soil and the area has been seeded or planted, the soil paint is applied. Thus, the fertilizer is covered with the paint, except at the points where cracks in the coating will eventually appear. In this manner, the fertilizer is bound to stay where it is put, and consequently, is available for the plants or seeds for which it was intended.

The ease with which plants can penetrate the soil paint is an important factor in its success. In the case of a bituminous material or its equivalent, the very softness of the material at temperatures conducive to germination of most of the seed that might be used, is a significant item from the standpoint of this penetration. An advantage of the bituminous material is that it will harden due to the cooling action of rain, and when hardened, will further prevent erosion.

Instead of first fertilizing the ground, it is obvious that the seed could be planted before the fertilizer is applied. Again, the ground might be fertilized before the application of the soil paint, and subsequently, holes might be made through the coating for the planting of seeds or plants. However, I prefer to proceed in such a way as to cover the entire surface of the planted area with the soil paint after fertilizing and planting.

The soil paint which I propose to use can be made in many different ways, and can be composed of various materials or combinations thereof. The consistency of the materials may also be varied to take care of certain crop characteristics. I may employ any of the following:

(1) *Bitumen.*—As defined by Webster's New International Dictionary, that is, "Originally mineral pitch or asphalt; now, any of a number of inflammable mineral substances, including hard, brittle asphalts, semi-solid mineral tars, petroleum, and naphthas."

(2) *Cutback asphalt.*—Is defined by The Asphalt Institute as "Asphalt cement which has been rendered liquid by fluxing it with a light, volatile petroleum distillate. Upon exposure to atmospheric conditions the volatile distillate evaporates, leaving the asphalt cement behind."

The term "asphalt cement" used in the preceding sentence is defined by The Institute as "refined asphalt, or a combination of refined asphalt and flux, of suitable consistency for paving purposes."

(3) *Emulsions.*—According to Abraham in his book, "Asphalts and Allied Substances," a "bituminous-aqueous emulsion consists of a dispersion of a liquid or semi-liquid bituminous substance throughout water, and a bituminous-aqueous suspension consists of a dispersion of a semi-solid or solid bituminous substance throughout water."

(4) *Suspension.*—The definition of a suspension is given in the foregoing definition of an emulsion.

(5) Suitable road or fuel oils.

The thickness of the coating can be varied to suit the conditions of exposure and/or the time through which the coating is supposed to function. Thus, the coatings on a terrace, exposed to erosion, would necessarily be thicker than the coating placed on a flat surface. Likewise, the thickness of a coating which would be used in connection with seeds of closely spaced, quickly germinating annular varieties would, in general, be thinner than the coatings which would be used with slow germinating but more widely spaced perennials. In this, it is assumed that the perennials would require a longer period of protection or mulch.

Ordinarily, the thickness of the coating should be somewhere between $\frac{1}{32}$ and $\frac{1}{16}$ of an inch. It can be varied in thickness from almost an infinitesimal amount up to approximately ½ inch.

In practicing my process, I have found that various types of plants, including alfalfa, blue grass, brome grass, rye grass, Lespedeza, meadow fescue, prairie mixture, orchard grass, redtop, and timothy, will push through the soil paint, and the plants will obtain enough air and water from rain through cracks in the coating to grow without hinderance. I have also found that such paint is not toxic to the plants, and even through the paint cracks, it will not wash away. I have found further that such paint will not absorb enough heat to damage the plants.

While I have disclosed what I now consider to be a preferred form of my invention, I am aware that changes may be made in the details disclosed, without departing from the spirit of the invention, as expressed in the claims.

What I claim and desire to secure by Letters Patent is:

1. In a method of the character described, coating the surface of planted soil with an adhesive paint of a character that will crack without breaking the bond between the paint and the soil, and of such a thickness that vegetation in its embryo state will grow therethrough.

2. A method of preventing soil erosion, comprising planting in the soil, and then covering the surface of the planted area with an adhesive paint of a character that will crack without breaking the bond between the paint and the soil, and of such thickness that the plants will grow therethrough.

3. A method of preventing soil erosion, comprising planting in fertilized soil, and afterwards coating the surface of the planted and fertilized soil with an adhesive paint of a character that will crack without breaking the bond between the paint and the soil, and of such a thickness that vegetation in its embryo state will grow therethrough.

4. A method of preventing soil erosion, comprising planting seeds, bulbs, roots, corms, tubers and the like in the soil, and then coating the surface of the planted soil with an adhesive paint of a character that will crack without breaking the bond between the paint and the soil, and of such thickness that plants from the seeds or the like will grow therethrough.

5. A method of the character described, comprising the following steps: (A) coating the surface of fertilized soil with an adhesive paint of a character that will crack without breaking the bond between the paint and the soil, and of such thickness that vegetation in its embryo state will grow therethrough, and penetrating the coating and (B) planting seeds or plants in the soil.

6. In a method of the character described, planting vegetation in its embryo stage in fertilized soil, and then covering the entire surface of the soil with an adhesive paint of a character that will crack without breaking the bond between the paint and the soil, and of such thickness that vegetation will grow therethrough.

7. In a method of the character described, coating the entire surface of planted soil with a bituminous adhesive paint of a character that will crack without breaking the bond between the paint and the soil, and of such thickness that vegetation in its embryo stage will grow therethrough.

8. In a method of the character described, planting vegetation in its embryo stage in soil; then covering the surface of the planted area with an adhesive paint of a character that will crack without breaking the bond between the paint and the soil, and then permitting the plants to grow through said covering.

ROLLIN J. SMITH.

CERTIFICATE OF CORRECTION.

Patent No. 2,333,959. November 9, 1943.

ROLLIN J. SMITH.

It is hereby certified that error appears in the printed specification of the above numbered patent requiring correction as follows: Page 1, first column, line 16, for "hollow" read --allow--; and that the said Letters Patent should be read with this correction therein that the same may conform to the record of the case in the Patent Office.

Signed and sealed this 8th day of February, A. D. 1944.

(Seal)
Henry Van Arsdale,
Acting Commissioner of Patents.